US012343850B1

(12) United States Patent
Zhang et al.

(10) Patent No.: US 12,343,850 B1
(45) Date of Patent: Jul. 1, 2025

(54) QUICK REMOVAL TOOLING FOR VALVE CORE

(71) Applicant: De Zhang, Zhejiang (CN)

(72) Inventors: De Zhang, Zhejiang (CN); Hongwei Wang, Zhejiang (CN)

(73) Assignee: De Zhang, Rui'An (CN)

( * ) Notice: Subject to any disclaimer, the term of this patent is extended or adjusted under 35 U.S.C. 154(b) by 0 days.

(21) Appl. No.: 18/985,447

(22) Filed: Dec. 18, 2024

(30) Foreign Application Priority Data

Jul. 10, 2024 (CN) ......................... 202421628446.4

(51) Int. Cl.
*B25B 27/24* (2006.01)
*B25B 27/02* (2006.01)

(52) U.S. Cl.
CPC ............ *B25B 27/24* (2013.01); *B25B 27/023* (2013.01)

(58) Field of Classification Search
CPC .............................. B25B 27/24; B25B 27/023
See application file for complete search history.

(56) References Cited

U.S. PATENT DOCUMENTS 2,951,282 A * 9/1960 Albright ............... B25B 27/023 29/259
3,952,394 A * 4/1976 Seminario ............... B25B 27/24 D8/51
6,152,165 A * 11/2000 Fukuda ................... B25B 27/24 81/177.85
9,278,439 B1 * 3/2016 Krause .................... B25B 27/24
2018/0304451 A1 * 10/2018 Seamons ................. B25B 27/24
2021/0308848 A1 * 10/2021 Widner ................... B25B 27/24
2022/0184785 A1 * 6/2022 Del Toro Manjarrez .................... B25B 27/023

* cited by examiner

*Primary Examiner* — Seahee Hong
(74) *Attorney, Agent, or Firm* — Daniel M. Cohn

(57) ABSTRACT

Disclosed is a quick removal tooling for a valve core, including a clamping sleeve, a rotary cap, a nut and a capped screw rod, where a first end portion of the clamping sleeve is provided with a clamping protrusion clamped with a valve body and an avoidance groove; a second end portion of the clamping sleeve is in sleeved connection with a first end portion of the rotary cap; the nut is fixed at a central hole of the rotary cap; a screw portion of the capped screw rod extends from a second end portion of the rotary cap, and extends into the clamping sleeve; and after the screw rod is in screwed connection with the valve core, the rotary cap is rotated, which drives rotation of the nut so as to push the screw rod to drive the valve core to be pulled out from the valve body.

10 Claims, 6 Drawing Sheets

QUICK REMOVAL TOOLING FOR VALVE CORE

TECHNICAL FIELD

The present disclosure relates to the technical field of quick valve core removal, and in particular to a quick removal tooling for a valve core.

BACKGROUND

A valve core is a valve part for enabling a valve body to achieve the basic functions of direction control, pressure control or flow control with the help of its movement. The valve core will be worn and aged after long-term use, and it needs to be replaced in time. However, for valve cores that are faulty or have corroded over time in valve bodies, it may be difficult to remove the valve cores or impossible to complete disassembly during replacement. At present, the method for removing the valve core is mainly to clamp a head of the valve core by pliers, and then take out the valve core by pulling with manpower or tapping with an external force. Not only is it laborious to remove and difficult to control force, but it is also easy to damage the valve body when disassembling in violent situations.

It can be seen that the existing methods for removing valve cores mentioned above have inconveniences and defects, and need to be further improved urgently. How to create a new quick removal tooling for a valve core, which utilizes the lead screw principle and makes the valve core pulled out of a valve body easily through the cooperation of a screw rod and a nut, with a simple and effortless structure, has become a goal that urgently needs improvement in the current industry.

SUMMARY

The technical problem to be solved by the present disclosure is to provide a quick removal tooling for a valve core, which utilizes the lead screw principle and makes the valve core pulled out of a valve body easily through the cooperation of a screw rod and a nut, with a simple and effortless structure, thereby overcoming the shortcomings of the existing valve core removing methods.

In order to solve the above technical problem, the present disclosure provides a quick removal tooling for a valve core, including a clamping sleeve, a rotary cap, a nut and a capped screw rod, where a first end portion of the clamping sleeve is provided with a clamping protrusion configured to be clamped with a valve body and an avoidance groove configured to avoid an outer end side of a valve core; a second end portion of the clamping sleeve is in sleeved connection with a first end portion of the rotary cap; the nut is fixed at a central hole of the rotary cap; a screw portion of the capped screw rod extends from a second end portion of the rotary cap, and extends into the clamping sleeve after being in screw thread fit with the nut for achieving matched connection with internal threads of a central hole of the valve core; and after the screw rod is in screwed connection with the valve core, the rotary cap is rotated, which drives rotation of the nut so as to push the screw rod to drive the valve core to be pulled out from the valve body.

For further improvement, the quick removal tooling further includes a rotating handle, where a through hole is reserved in the middle of the rotating handle, the rotary cap is provided with a radial through hole in a side wall close to the second end portion, and the radial through hole is perpendicular to the central hole of the rotary cap; and after the rotating handle passes through the radial through hole, the through hole of the rotating handle is coaxial with the central hole of the rotary cap for the screw rod to pass through.

For further improvement, a counter bored hole is reserved in the second end portion of the rotary cap, and the nut is clamped at the counter bored hole.

For further improvement, the rotating handle is arranged outside the nut to prevent the nut from getting away from the rotary cap.

For further improvement, the quick removal tooling further includes a clamp ring, where a clamping slot is formed in the first end portion of the rotary cap that extends into the second end portion of the clamping sleeve, and the clamp ring is arranged in the clamping slot to prevent the rotary cap from getting away from the clamping sleeve.

For further improvement, the clamp ring is an E-shaped clamp ring.

For further improvement, the clamping sleeve is provided with an observation window in a side wall close to the second end portion, and the observation window is configured to observe whether the valve core is pulled out in place.

For further improvement, a bearing is arranged at a part where the second end portion of the clamping sleeve is in sleeved connection with the first end portion of the rotary cap.

For further improvement, the bearing is a thrust bearing.

For further improvement, the clamping sleeve and the rotary cap are made of a lightweight metal material.

With such a design, the present disclosure has at least the following advantages:

1. Under the driving of the rotary cap, the valve core is easily pulled out from the valve body by relying on the cooperation of the nut and the screw rod. The present disclosure is simple in structure, convenient to operate, controllable in the entire process, and labor-saving.
2. Moreover, due to arrangement of the rotating handle, it can not only ensure that the nut will not get away from the rotary cap, but is also conducive to the rotation of the rotary cap, thereby saving effort and facilitating operation.
3. The thrust bearing is arranged to reduce the friction between the clamping sleeve and the rotary cap, and withstand a greater axial force, so that the smooth removing of the valve core is guaranteed, and the removing process thereof is labor-saving and fast.

BRIEF DESCRIPTION OF FIGURES

The foregoing descriptions are merely an overview of the technical solutions of the present disclosure. In order to more clearly understand the technical means of the present disclosure, the present disclosure will be further described in detail below with reference to the accompanying drawings and specific embodiments.

DETAILED DESCRIPTION

Figure 1:
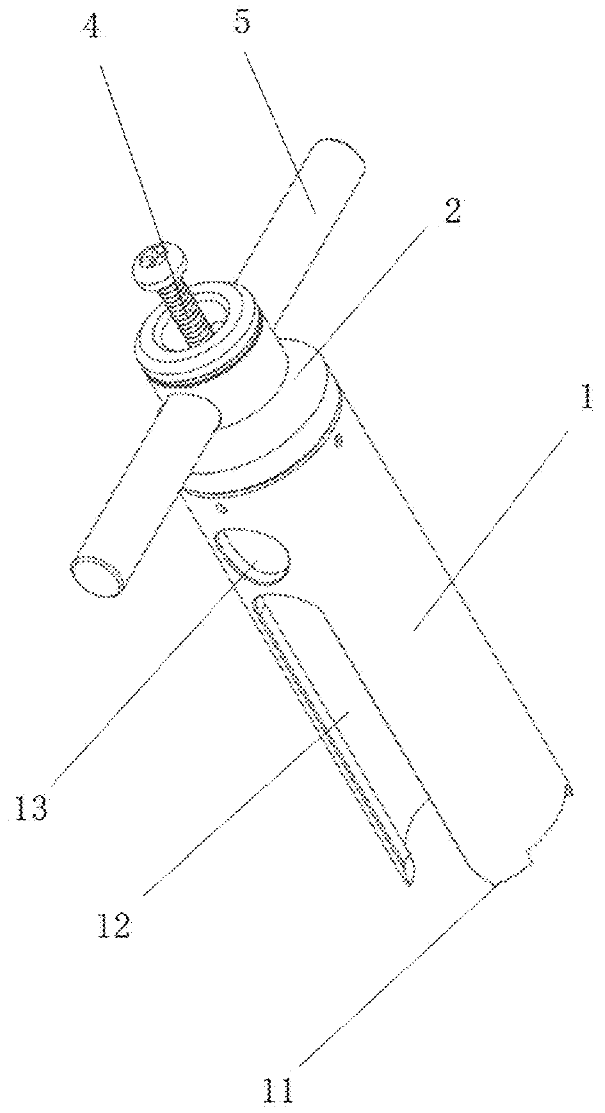
FIG. 1 is a schematic diagram of the three-dimensional structure of a quick removal tooling for a valve core according to the present disclosure.
Figure 2:
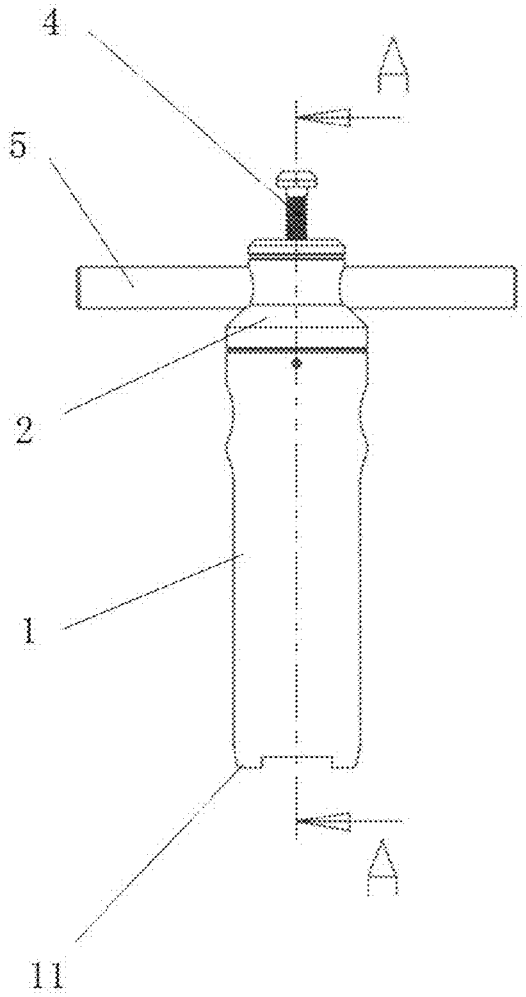
FIG. 2 is a front view of the structure of a quick removal tooling for a valve core according to the present disclosure.

Exemplary embodiments of the present disclosure will be described in more detail below in conjunction with the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to convey the complete scope of the present disclosure to those skilled in the art.

Referring to FIG. 1 to FIG. 6, this embodiment provides a quick removal tooling for a valve core, which includes a clamping sleeve 1, a rotary cap 2, a nut 3, a capped screw rod 4, and a rotating handle 5.

A first end portion of the clamping sleeve 1 is provided with a clamping protrusion 11 configured to be clamped with a valve body 10, and an avoidance groove 12 configured to avoid an outer end side of a valve core 20; and a second end portion of the clamping sleeve 1 is in sleeved connection with a first end portion of the rotary cap 2, so that the rotary cap 2 can rotate relative to the clamping sleeve 1. The nut 3 is fixed at a central hole 21 of the rotary cap 2. The rotary cap 2 is provided with a radial through hole 22 in a side wall close to a second end portion, and the radial through hole is perpendicular to the central hole 21 of the rotary cap. A through hole 51 is reserved in the middle of the rotating handle 5, and the rotating handle 5 is vertically inserted into the rotary cap 2 from the radial through hole 22, so that the through hole 51 of the rotating handle 5 is coaxial with the central hole 21 of the rotary cap 2 for the screw rod 4 to pass through. A screw portion of the capped screw rod 4 extends from the second end portion of the rotary cap 2, passes through the through hole 51 of the rotating handle 5, is matched with the nut 3 by threads, and then extends into the clamping sleeve 1 for achieving matched connection with internal threads of a central hole of the valve core 20.

Figure 7:
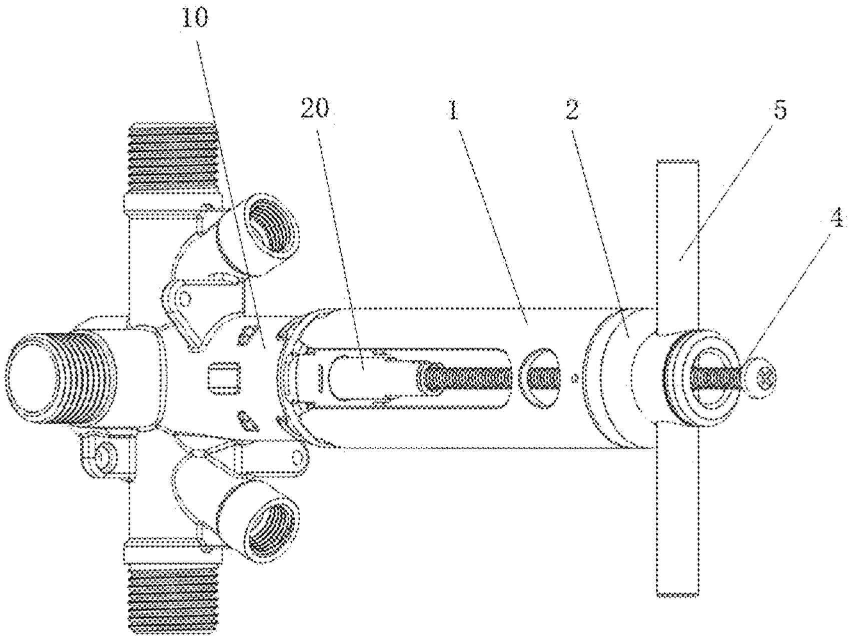
FIG. 7 is a schematic diagram of the structure of a quick removal tooling for a valve core according to the present disclosure applied to a valve body (the valve core is not pulled out).
Figure 8:
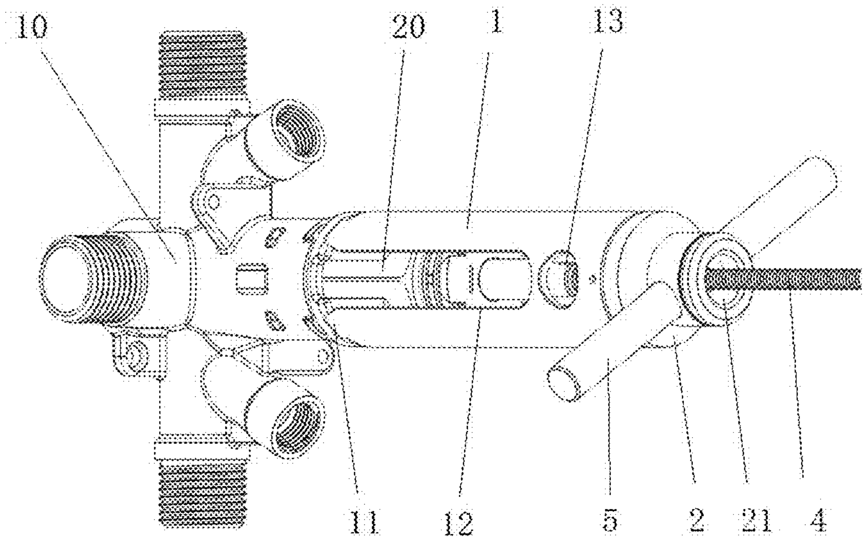
FIG. 8 is a schematic diagram of the structure of a quick removal tooling for a valve core according to the present disclosure applied to a valve body (the valve core is pulled out).

When in use, after the screw rod 4 is in screwed connection with the valve core 20, the rotating handle 5 is rotated to drive rotation of the rotary cap 2, and the rotary cap 2 drives rotation of the nut 3 so as to push the screw rod 4 to move linearly relative to the rotary cap 2, so that the valve core 20 is ultimately driven to be pulled out of the valve body 10. The removing process is shown in FIG. 7 and FIG. 8. FIG. 7 shows the state where the quick removal tooling for the valve core acts on the valve body, but the valve core is not pulled out; and FIG. 8 shows the state where the quick removal tooling for the valve core acts on the valve body, and part of the valve core is pulled out.

Figure 3:
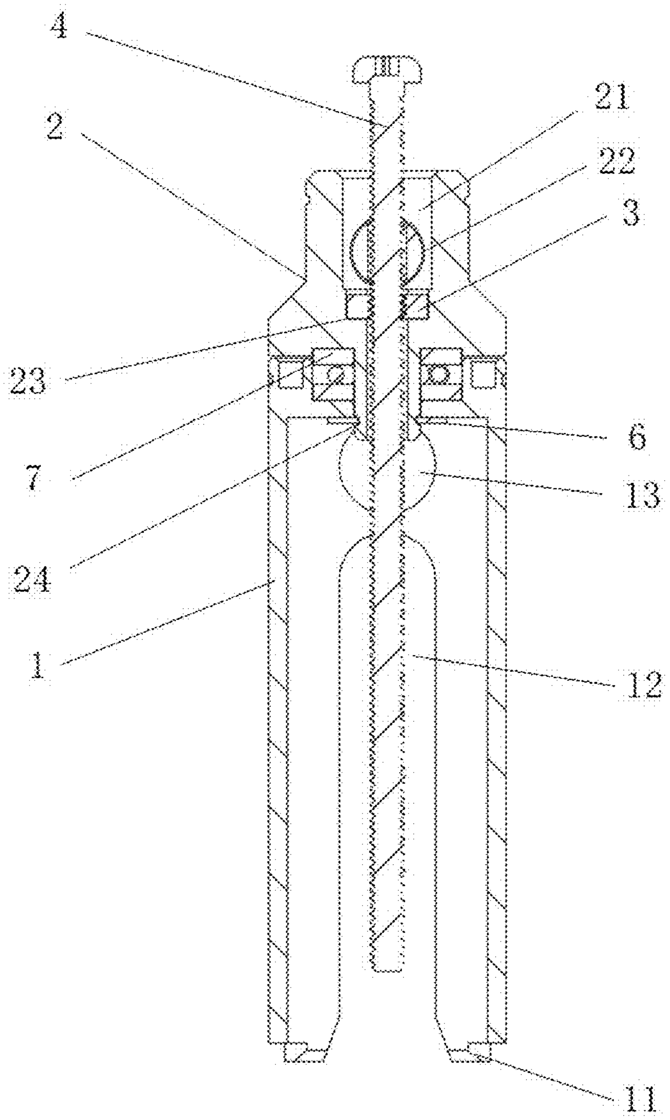
FIG. 3 is a cross-sectional view taken along the line A-A in FIG. 2.
Figure 4:
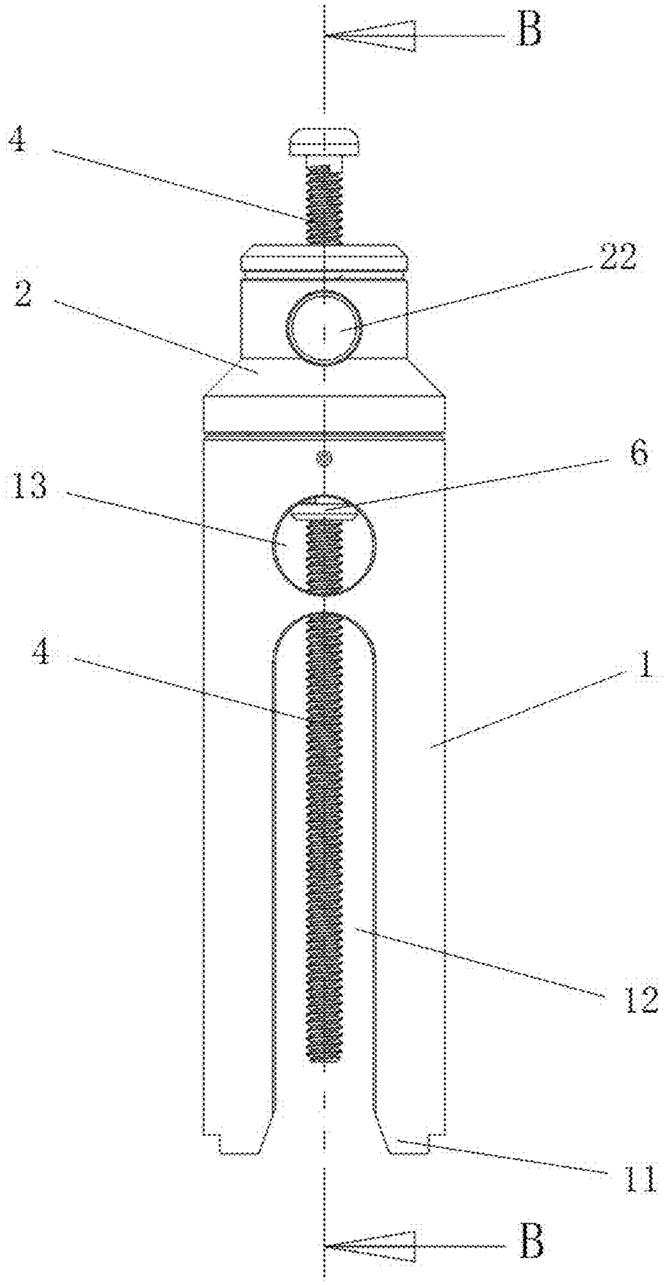
FIG. 4 is a side view of the structure of a quick removal tooling for a valve core according to the present disclosure.
Figure 5:
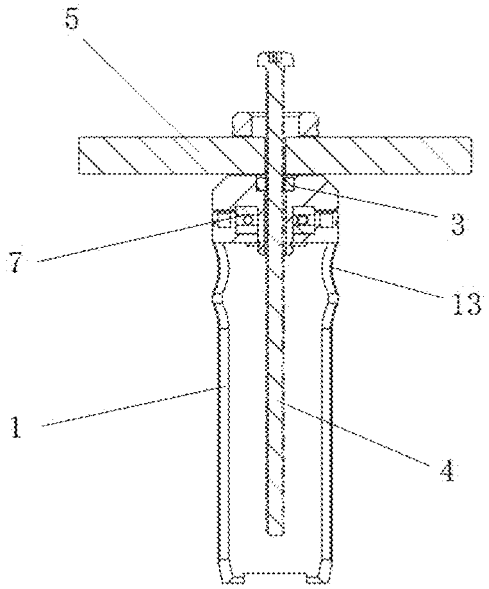
FIG. 5 is a cross-sectional view taken along the line B-B in FIG. 4.

Specifically, referring to FIG. 3 and FIG. 5, in this embodiment, a counter bored hole 23 is reserved in the second end portion of the rotary cap 2, and the nut 3 is clamped at the counter bored hole 23. That is, the rotating handle 5 is arranged at an upper end of the nut 3, which can prevent the nut 3 from getting away from the second end portion of the rotary cap 2.

Figure 6:
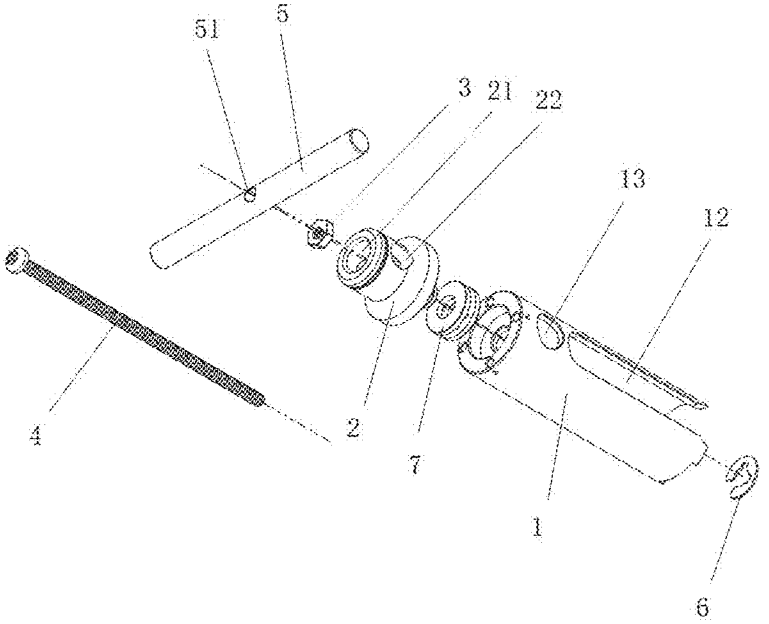
FIG. 6 is a schematic diagram of the exploded structure of a quick removal tooling for a valve core according to the present disclosure.

Preferably, referring to FIG. 3 and FIG. 6, in this embodiment, the quick removal tooling for the valve core further includes a clamp ring 6, a clamping slot 24 is formed in the first end portion of the rotary cap 2 that extends into the second end portion of the clamping sleeve 1, and the clamp ring 6 is arranged in the clamping slot 24 to prevent the rotary cap 2 from getting away from the clamping sleeve 1.

Specifically, the clamp ring 6 is an E-shaped clamp ring.

In this embodiment, the clamping sleeve 1 is provided with an observation window 13 in a side wall close to the second end portion, and the observation window is configured to observe whether the valve core 20 is pulled out in place. As shown in FIG. 8, when the end portion of the valve core 20 reaches the observation window 13, it indicates that the valve core 20 has been pulled out in place, and the removal tooling can be moved away from the valve body 10 to achieve the disassembly of the valve core 20.

More preferably, as shown in FIG. 3 and FIG. 5, a bearing 7 is arranged at a part where the second end portion of the clamping sleeve 1 is in sleeved connection with the first end portion of the rotary cap 2. It is preferable to use a thrust bearing to better bear an axial force required by the removal tooling when the valve core is pulled out, thereby ensuring smooth disassembly of the valve core.

In this embodiment, the clamping sleeve 1 and the rotary cap 2 are made of a lightweight metal material, such as an aluminum alloy material, which is light and easy to operate.

The quick removal tooling for the valve core utilizes the lead screw principle and makes the valve core pulled out of the valve body easily through the cooperation of the screw rod and the nut, and the removing progress can be observed at any time during the disassembly process, so that the entire process is controllable, and the operation is easy and effortless. There is no need for other tools during the disassembly process, which is very efficient and labor-saving, and can also avoid damage to the valve body caused by improper disassembly.

The foregoing descriptions are merely exemplary embodiments of the present disclosure, and are not intended to limit the present disclosure in any form. Some simple amendments, equivalent changes or modifications made by those skilled in the art based on the technical contents disclosed above shall fall within the protection scope of the present disclosure.

What is claimed is:

1. A quick removal tooling for a valve core, comprising a clamping sleeve, a rotary cap, a nut and a capped screw rod, wherein a first end portion of the clamping sleeve is provided with a clamping protrusion configured to be clamped with a valve body and an avoidance groove configured to avoid an outer end side of the valve core; a second end portion of the clamping sleeve is in sleeved connection with a first end portion of the rotary cap; the nut is fixed at a central hole of the rotary cap; a screw portion of the capped screw rod extends from a second end portion of the rotary cap, and extends into the clamping sleeve after being in screw thread fit with the nut for achieving matched connection with internal threads of a central hole of the valve core; and after the screw rod is in screwed connection with the valve core, the rotary cap is rotated, which drives rotation of the nut so as to push the screw rod to drive the valve core to be pulled out from the valve body.

2. The quick removal tooling for the valve core according to claim 1, further comprising a rotating handle, wherein a through hole is reserved in the middle of the rotating handle, the rotary cap is provided with a radial through hole in a side wall close to the second end portion, and the radial through hole is perpendicular to the central hole of the rotary cap; and after the rotating handle passes through the radial through hole, the through hole of the rotating handle is coaxial with the central hole of the rotary cap for the screw rod to pass through.

3. The quick removal tooling for the valve core according to claim 2, wherein a counter bored hole is reserved in the second end portion of the rotary cap, and the nut is clamped at the counter bored hole.

4. The quick removal tooling for the valve core according to claim 3, wherein the rotating handle is arranged outside the nut to prevent the nut from getting away from the rotary cap.

5. The quick removal tooling for the valve core according to claim 1, further comprising a clamp ring, wherein a clamping slot is formed in the first end portion of the rotary cap that extends into the second end portion of the clamping sleeve, and the clamp ring is arranged in the clamping slot to prevent the rotary cap from getting away from the clamping sleeve.

6. The quick removal tooling for the valve core according to claim 5, wherein the clamp ring is an E-shaped clamp ring.

7. The quick removal tooling for the valve core according to claim 1, wherein the clamping sleeve is provided with an observation window in a side wall close to the second end portion, and the observation window is configured to observe whether the valve core is pulled out in place.

8. The quick removal tooling for the valve core according to claim 1, wherein a bearing is arranged at a part where the second end portion of the clamping sleeve is in sleeved connection with the first end portion of the rotary cap.

9. The quick removal tooling for the valve core according to claim 8, wherein the bearing is a thrust bearing.

10. The quick removal tooling for the valve core according to claim 1, wherein the clamping sleeve and the rotary cap are made of a lightweight metal material.

* * * * *